United States Patent
Pfeiffer

(10) Patent No.: US 6,775,484 B1
(45) Date of Patent: Aug. 10, 2004

(54) RECEIVER FOR RECEIVING OPTICAL SIGNALS

(75) Inventor: Thomas Pfeiffer, Stuttgart (DE)

(73) Assignee: Alcatel Alsthom Compagnie Generale d'Electricite, Paris (FR)

( * ) Notice: Subject to any disclaimer, the term of this patent is extended or adjusted under 35 U.S.C. 154(b) by 0 days.

(21) Appl. No.: 09/086,026

(22) Filed: May 28, 1998

(30) Foreign Application Priority Data

| Jun. 3, 1997 | (DE) | 197 23 103 |
| Nov. 5, 1997 | (DE) | 197 48 756 |
| Mar. 5, 1998 | (DE) | 198 09 366 |

(51) Int. Cl.$^7$ .................................. H04B 10/06
(52) U.S. Cl. .................. 398/204; 398/208; 398/212
(58) Field of Search .................. 359/161, 164, 359/168, 169, 170, 189, 191, 192, 193, 195, 194, 584; 398/202–214, 584, 13, 24, 28; 250/551, 559.11, 214 C, 214 DC

(56) References Cited

U.S. PATENT DOCUMENTS

| 5,081,644 A | | 1/1992 | Uchida et al. ................. 375/1 |
| 5,115,332 A | | 5/1992 | Naito et al. .................. 359/189 |
| 5,202,791 A | * | 4/1993 | Kaede ......................... 359/345 |
| 5,317,660 A | | 5/1994 | Veith ........................... 385/24 |
| 5,483,368 A | * | 1/1996 | Ohshima ..................... 359/124 |
| 5,491,577 A | * | 2/1996 | Gautheron et al. |
| 5,523,874 A | * | 6/1996 | Epworth ..................... 359/161 |
| 5,742,418 A | * | 4/1998 | Mizutani .................... 359/156 |
| 5,896,221 A | * | 4/1999 | Saeki .......................... 359/341 |

FOREIGN PATENT DOCUMENTS

| DE | 2333968 | 1/1975 |
| DE | 2400491 | 6/1975 |
| DE | 3011501 | 10/1981 |
| DE | 3317894 | 11/1983 |
| DE | 3227682 | 2/1984 |
| DE | 3840855 | 6/1990 |
| DE | 4403985 | 8/1995 |
| DE | 19605567 | 8/1997 |
| DE | 19704545 | 8/1997 |
| EP | 0798883 | 10/1997 |

OTHER PUBLICATIONS

Moeller, L "An Optical CDMA Method Based on Periodic Spectrum Encoding" Thirteenth Annual Conference of European Fibre Optic Communications and Networks, 1995.*

(List continued on next page.)

Primary Examiner—Jason Chan
Assistant Examiner—Agustin Bello
(74) Attorney, Agent, or Firm—Ware, Fressola, Van Der Sluys & adolphson LLP

(57) ABSTRACT

A receiver (EMP1, . . . , EMPn) is disclosed for receiving optical signals from an optical transmission network (NET) serving to transmit coded, multiplexed optical signals. The receiver (EMP1, . . . , EMPn) includes a means (DEK1) for detecting the optical signals to be received, e.g., a Fabry-Perot filter, and processing means (O/E1, 0/E2, 5) to compensate noise present in the detected optical signals by combining the detected optical signals with compensation signals. The means (DEK1) is adapted to transmit optical signals to be received and reflect optical signals not to be received. A further means (K1), e.g., an optical coupler, is provided for deriving the compensation signals from at least part of the reflected optical signals and then applying the compensation signals to the processing means (O/E1, O/E2, 5). The receiver has the advantage that the signal to be received is not contained, or is contained only minimally, in the compensation signal, so that it does not affect, or affects only insignificantly,the degree of compensation when being combined with the detected signal.

8 Claims, 3 Drawing Sheets

OTHER PUBLICATIONS

"Optotuner–Chip für den Daten–Highway", C. Reuber, *Elektronik*, vol. 15, 1994, Jul. 26, 1994, pp. 46–50.

"Reflexionsvermogen 99.9%", W. Heitmann, *elektronik–zeitung*, Sep. 3, 1965.

"Surface Micromachined Fabry–Perot Tunable Filter", A. Tran et al, *IEEE Photonics Technology Letters*, vol. 8, No. 3, Mar. 1996, pp. 393–398.

"An Optical CDMA Method Based on Periodic Spectrum Encoding", L. Moller, *Proc. of the Thirteenth Annual Conf. on European Fibre Optic Communications and Networks*, Brighton, Englang 1995, pp. 178–181.

H–G. Unger, "Optische Nachrichtentechnik—Teil 1: Optische Wellenleiter", Huthig Buch Verlag Heidelberg, 1990, pp. 298–302.

H–G. Unger, "Optische Nachrichtentechnik—Teil II: Komponenten, Systeme, Messtechnik", Huthig Buch Verlag Heidelberg, 1992, pp. 355–356.

\* cited by examiner

RECEIVER FOR RECEIVING OPTICAL SIGNALS

BACKGROUND OF THE INVENTION

1. Technical Field

This invention relates to a receiver for receiving optical signals from an optical communications network for transmitting coded, multiplexed optical signals. The receiver includes means for detecting the optical signals to be received and processing means to compensate the noise present in the detected optical signals by combining the detected optical signals with compensation signals.

2. Discussion of Related Art

Such a receiver is known, for example, from the Proceedings of the Thirteenth Annual Conference on European Fiber Optic Communications and Networks, Brighton, England, 1995, pages 178 to 181 authorized by L. Möller. A receiver for a CDMA system is described which includes a periodic filter for detecting the optical signals to be received. The filter passes the detected optical signals to a photodiode, where they are converted from optical to electrical form. Also provided is an optical coupler which removes part of the optical signals transmitted through the CMDA network and routes these signals to a further photodiode. The removed signals serve as compensation signals which, after being converted from optical to electrical form, are first attenuated and then applied to the negative input of a differential amplifier. The positive input of the differential amplifier receives the detected signals from the filter converted to electrical form. The compensation of noise in the detected signals is achieved by comparing the detected signals with the compensation signals. A disadvantage is that the compensation signals used for the comparison include a part of the optical signals to be received, which is subtracted from the detected signal during the comparison, whereby the degree of compensation is deteriorated. The compensation method is only suitable for a CDMA system comprising a plurality of optical transmitters and receivers, since in such a system, the effect of the impairment of the compensation caused by the subtraction of the part of the signal to be received is reduced. Thus, the smaller the finesse of the periodic filter, the less efficient the compensation method will be; the finesse is explained in the above-mentioned article and is inversely proportional to the half-power bandwidth of the passband.

SUMMARY OF INVENTION

It is therefore an object of the invention to provide a receiver which uses an improved compensation method and is suitable for systems with as little as two transmitters.

According to the invention, this object is attained by a receiver for receiving optical signals from an optical communications network for transmitting coded, multiplexed optical signals, comprising a means for detecting the optical signals to be received and processing means for compensating noise present in the detected optical signals by combining the detected optical signals with compensation signals. The receiver is characterized in that it comprises a means adapted to pass optical signals to be received and reflect optical signals not to be received, and that a further means is provided for deriving the compensation signals from at least a part of the reflected optical signals and then applying them to the processing means. The receiver according to the invention has the advantage that the signal to be received, in particular, is not contained, or contained only minimally, in the compensation signal, so that it will not affect, or affect only insignificantly, the degree of compensation when being combined with the detected signal. Another advantage is that, in one embodiment, a test signal is additionally introduced into one of the signal branches in order to achieve even more selective compensation. These and other objects, features and advantages of the present invention will become more apparent in light of the detailed description of a best mode embodiment thereof, as illustrated in the accompanying drawing.

DETAILED DESCRIPTION OF PREFERRED EMBODIMENT

Figure 1:
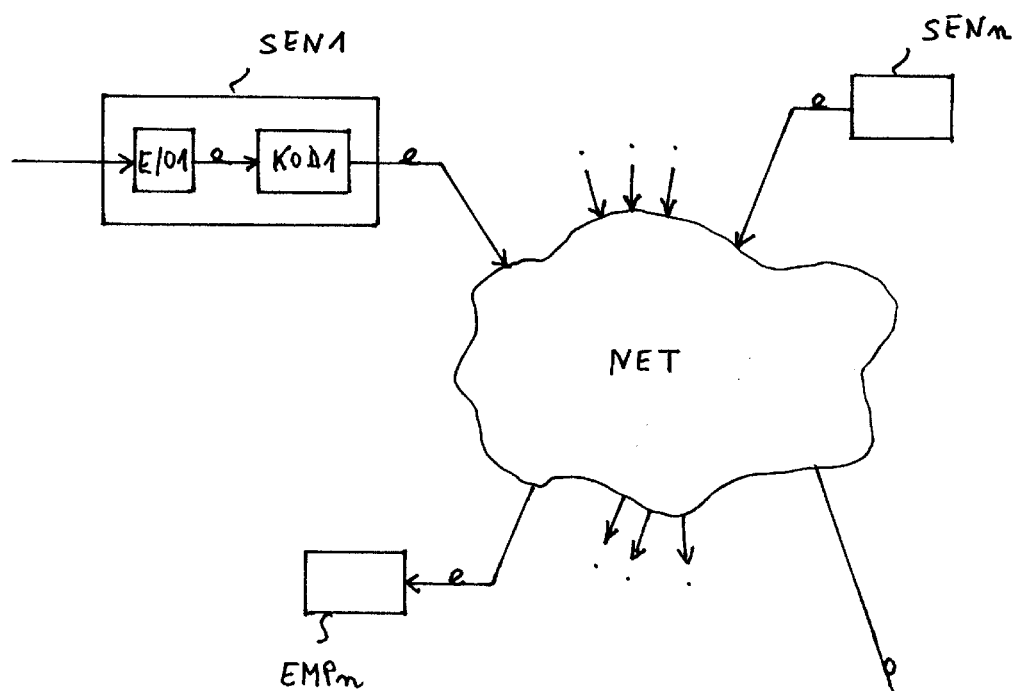
FIG. 1 shows an optical communication system in schematic form, according to the present invention.
Figure 1:
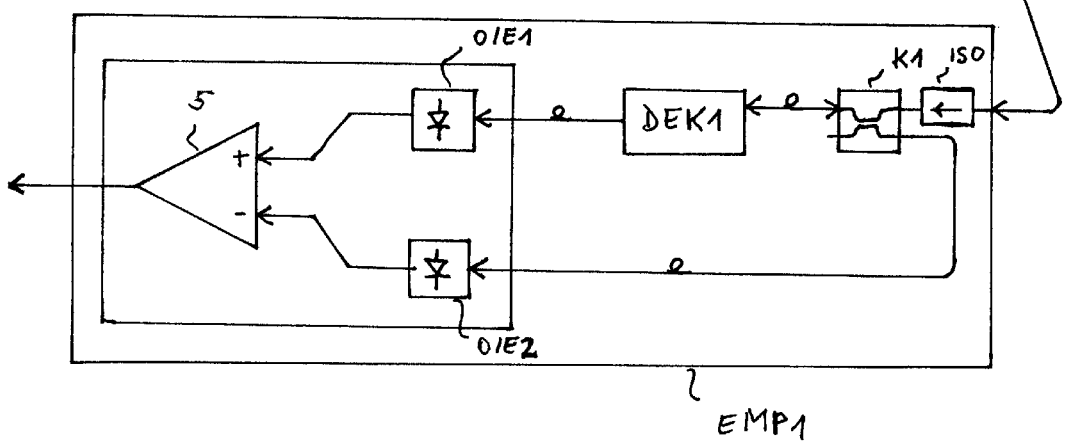

The optical communications system shown schematically in FIG. 1 contains at least two transmitters SEN1, . . . , SENn, at least one receiver EMP1, . . . , EMPn, and an optical transmission network NET through which the optical signals from the transmitters SEN1, . . . , SENn are transmitted to the receivers EMP1, . . . , EMPn; n is a natural number greater than 1. The optical transmission network NET is, for example, a multipoint-to-multipoint network consisting of fiber-optic links, optical splitters, and, if necessary, optical amplifiers, and serves to transmit coded, multiplexed optical signals. Each of the transmitters SEN, . . . , SENn includes an encoder KOD1 in which the signals to be transmitted can be encoded before being transmitted into the optical transmission network ENT. The encoding is performed optically, e.g. by frequency code modulation using an optical filter. Each of the receivers EMP1, . . . , EMPn that wants to receive the optical signals from transmitter SEN1 must include a decoder DEK1 which is matched to the encoder KOD1 of transmitter SEN1. In the simplest case, the frequency ranges in which optical signals are passed and the frequency ranges in which optical signals are blocked are the same in the encoder KOD1 and the decoder DEK1, which also includes an optical filter, for example. Prior to the optical filtering, the electric signals to be transmitted are converted, e.g. in an electrical-to-optical transducer E/O1, into optical signals, which are subsequently filtered. Such a coding scheme is known, for example, by the terms "code division multiple access (CDMA)" and "spread spectrum".

The receiver EMP1 includes a means DEK1 for detecting the optical signals to be received. The means is a decoder DEK1 which is matched to the encoder of the transmitter whose optical signal it wants or is authorized to receive. Preferably, the means DEK1 is a periodic optical filter, particularly a Fabry-Perot filter. A Fabry-Perot filter transmits optical signals to be received and reflects optical signals not to be received.

The receiver EMP1 further includes processing means O/E1, O/E2, 5 to compensate the noise present in the detected optical signals by combining the detected optical signals with compensation signals. Particularly if several transmitters SEN1, ..., SENn are active simultaneously, the optical signals from transmitters SEN2 to SENn will be coupled to the channel being used by transmitter SEN1 and to be received by receiver EMP1. Thus, the detected signals will also include components of optical signals from transmitters SEN2 to SENn, which appear as interference. The interference can be minimized by combining the detected optical signals with compensation signals.

The receiver EMP1 therefore includes a further means K1 for deriving the compensation signals from at least part of the reflected optical signals and then feeding them to the processing means O/E1, O/E2, 5. The further means K1 is preferably an optical coupling device, particularly a so-called asymmetrical coupler which removes e.g. 10% or 20% of the optical power from an optical transmission line.

An optical transmission line is provided for feeding the optical signals transmitted through the optical transmission network NET to the means DEK1. The electric signals to be transmitted by transmitter SEN1 are thus converted into optical form, optically frequency-code-modulated, and then transmitted through the optical transmission network NET to receiver EMP1, where they are transferred over the optical transmission line to the Fabry-Perot filter DEK1, which optically decodes the optical signals to be received and passes them over a further optical transmission line to the processing means O/E1, O/E2, 5, and which reflects the optical signals not to be received into the optical transmission line from which it received the optical signals of transmitter SEN1. This optical transmission line contains the further means K1. The further means K1 is an optical coupling device which extracts at least part of the reflected optical signals from the optical transmission line in a direction opposite to the propagation direction of the optical signals transmitted through the optical transmission network NET. The extracted optical signals represent the compensation signals, which are transferred over a further optical transmission line to the processing means O/E1, O/E2, 5. These compensation signals do not contain, or contain only minimum portions of, the optical signals from transmitter SEN1, since these were transmitted by the Fabry-Periot filter DEK1. The compensation signals then contain only, or essentially only, optical signals from transmitters SEN2 to SENn which are active, i.e., which are transmitting optical signals.

The coupling factor of the optical coupling device Ki is preferably chosen so that the optical power of the extracted reflected signals is equal to the mean of the optical power of the signals transmitted by the Fabry-Periot filter DEK1. This is accomplished by feeding the processing means O/E1, O/E2, 5 with optical signals whose optical powers have a defined ratio, so that a combination of the signals is simplified.

If, for example, only 20% of the optical power are coupled out by the optical coupling device K1, then 80% of the optical power will remain in the optical transmission line connected to the optical transmission network NET. These 80% will then be transferred into the optical transmission network NET. To prevent this, an optical isolator ISO may be provided which is inserted into the optical transmission line in such a way as to pass only the optical signals from the optical transmission network NET and block the 80% of the reflected signals which were not coupled out. Alternatively, 100% of the reflected optical signals may be extracted and the necessary level adaptation may be effected by means of an attenuator (not shown) inserted between the optical coupling device K1 and the processing means O/E1, O/E2, 5. Level adaptation may also be accomplished by means of an electrical attenuator in the processing means O/E1, O/E2, 5.

The processing means O/E1, O/E2, 5 consist of a first optical-to-electrical transducer O/E1 for converting the transmitted optical signals into first electric signals, a second optical-to-electrical transducer O/E2 for converting the optical compensation signals into second electric signals, and a differential amplifier 5 for comparing the first and second electric signals.

The optical-to-electrical transducers O/E1 and O/E2 may be implemented with photodiodes, for example. The differential amplifier 5 is, for example, an operational amplifier 5 with a positive and a negative input.

The signals transmitted by the decoder DEK1, which were converted into first electric signals, are applied to the positive input of the operational amplifier 5. The part of the extracted reflected signals, after being converted from optical-to-electrical form and, if necessary, optically or electrically attenuated for effecting level adaptation, is applied to the negative input of the operational amplifier 5. The signal adaptation is effected such that on an average, the levels of the first and second electrical signals at the inputs of the operational amplifier 5 have equal values. In this manner, part of the reflected signals are subtracted from the detected signals, whereby compensation of the noise in the detected signals is introduced. The output of the operational amplifier 5 thus provides compensated electric signals which ideally correspond to the electric signals fed to transmitter SEN1 for transmission.

The use of such a balanced receiver is limited by the fact that for optimum suppression of the unwanted channels, the propagation delays of the signals from the optical filter to the input of the differential amplifier must match very accurately for both signal arms of the receiver. Also, the levels of the interference signals at the input of the receiver must be identical. However, minor delay-time and level differences are hard to avoid.

The receiver for spectrum-encoded optical signals according to the features of the claims has the advantage that the different propagation factors in the signal arms of the receiver, namely amplitude reduction and delay difference of the signals, can be compensated for. To do this, the light of a light-emitting diode is fed as a test signal into both signal branches. Via control capabilities in one of the branches, the different propagation factors of the signal arms are advantageously matched, whereby optimum suppression of the interference signals at the output of the differential amplifier is achieved. To accomplish this, the receiver includes delay-adapting means and amplitude-adapting means which cause the two branches to be matched via a feedback control loop.

It is particularly advantageous to connect the inputs of the delay-adapting means, the amplitude-adapting means, and the control means for the light-emitting diode to the output of the differential amplifier and to detect the portion of the test signal which is not suppressed. Thus, if a perfect match is obtained, the test signal is completely suppressed, so that the interference signals are eliminated.

The test signal is modulated at a frequency $f_0$ which lies in the range of the information signal and thus permits an optimum measurement of the differences in the two branches. The test signal may also be modulated with a characteristic pattern.

The delay-adapting means and the amplitude-adapting means are advantageously implemented with electronic or optical components. It is also advantageous if one of the two branches contains presettable compensating means, i.e., a fixed phase-shifter and a fixed-gain amplifier, while the other branch permits a variable adaptation of the propagation factors.

Figure 2:
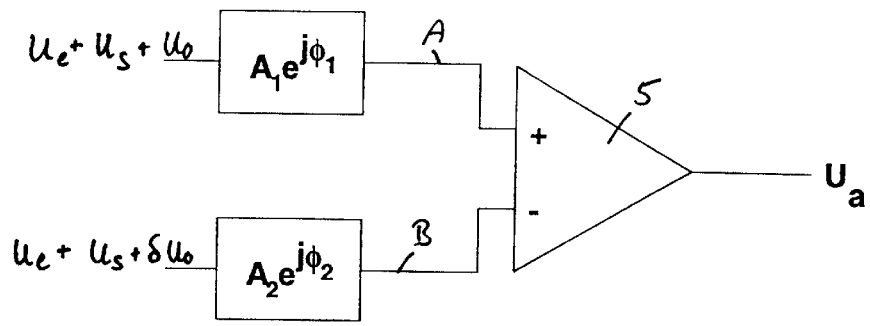
FIG. 2 shows schematically the input and output of the differential amplifier of FIG. 1.
Figure 3:
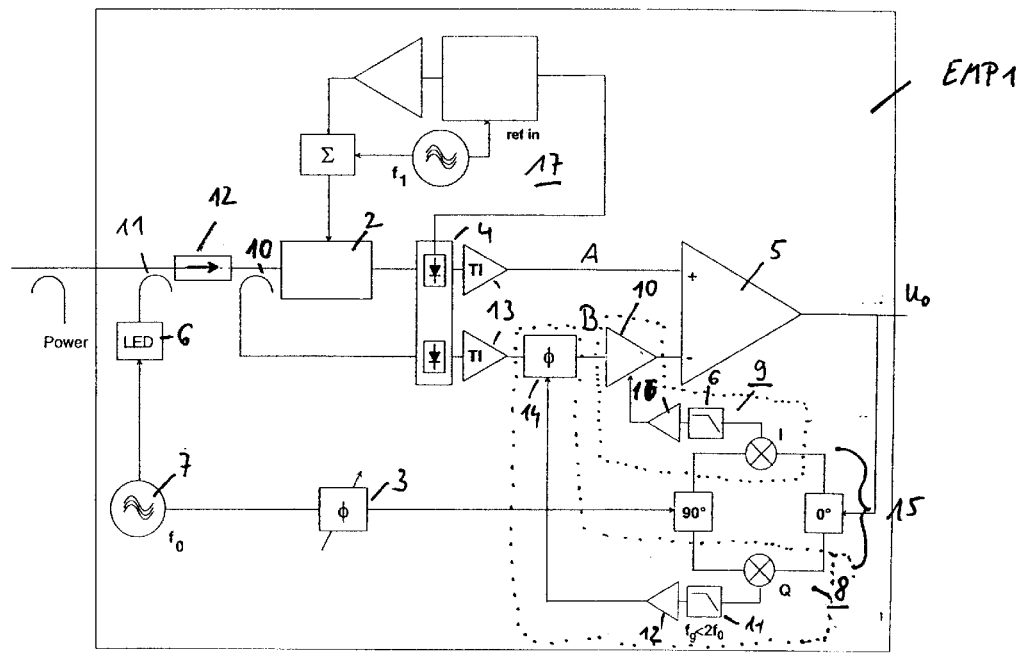
FIG. 3 shows the An construction of a receiver for spectrum-encoded optical signals.

FIG. 2 shows schematically the input and output of the differential amplifier, and FIG. 3 shows the construction of a receiver for spectrum-encoded optical signals.

FIG. 2 shows the two input branches of the differential amplifier 5. The upper branch A contains signal components consisting of the signal to be detected, $U_0$, an interference-signal component $U_s$, and the test signal $U_e$. These signal components pass through a phase delay element $\Phi_1$ which is also capable of changing the amplitude $A_1$. The second branch B contains signal components consisting of interference signal $U_s$, test signal $U_e$, and a slightly different component $\delta U_0$ of the signal to be detected. The two branches are connected to the two inputs of the differential amplifier 5. The output signal is $U_a$. The differences of the propagation factors $A_1$ and $A_2$ as well as $\Phi_1$ and $\Phi_2$ are to be measured and compensated by suitable feedback control loops. The output signal obtained from the above-mentioned mixture of signal components is $$U_a(t) = (A_1 e^{j\varphi_1} - A_2 e^{j\varphi_2}) \cdot \left\{ U_e \cos(\omega_0 t + \vartheta) + \sum_{channels} U_{signal}(t) \right\} +$$
$$(A_1 e^{j\varphi_1} \cdot U_0(t) - A_2 e^{j\varphi_2} \cdot \delta U_0(t))$$

Let us assume that the additional test signal of amplitude $U_e$ is intensity-modulated with $\omega_0=2\Pi f_0$. $U_S$ denotes the interference signals to be suppressed, and $U_0$ and $\delta U_0$ denote the signal to be received. The amplitude of the test signal is $$\left| \frac{U_a}{U_e} \right|^2_{\omega=\omega_0} = A_1^2 \cdot \left( 1 + \left( \frac{A_2}{A_1} \right)^2 - 2\frac{A_2}{A_1} \cos(\varphi_2 - \varphi_1) \right)$$

From the above relation it is apparent that the test signal can be eliminated by suitable compensation of the amplitude difference and the phase difference. When $U_e$ is eliminated, the interference signals $U_s$ are also eliminated, but not $U_0$ and $\delta U_0$.

FIG. 3 shows the above arrangement in a receiver EMP1 for detecting spectrum-encoded signals. The signal received by the receiver EMP1 consists of a multitude of different spectra which are placed on the transmission link by different transmitters. These spectrum-encoded, individual channels are separated in the receiver EMP1.

The incoming signal passes through a coupler 11 which is connected to a light-emitting diode 6 with an associated control 7, implemented with an HF current source. It then passes through an optical isolator 12 and a further coupler 10, which splits the incoming signal. The incoming signal then passes through an optical filter 2, a photodiode 4, and an amplifier 13 and is coupled to the positive input of the differential amplifier 5. Branch A contains no further components. The portion split from the incoming signal passes through a photodiode 4, an amplifier 13, and, in branch B, delay-adapting means 8 and amplitude-adapting means 9, and is applied to the negative input of the differential amplifier. The output of the differential amplifier 5 provides the output signal $U_a$. It is connected to the input of an evaluating circuit 15 in which the output signal is separated into an in-phase component I and a quadrature component Q. The I signal passes through a low-pass filter 6 and an integrator 16 forming part of the amplitude-adapting means 9. The output of the integrator 16 controls a variable-gain amplifier 10. The Q signal passes through a low-pass filter 11 and an integrator 12, whose output controls a phase shifter 14. Connected to the evaluating circuit 15 is a component 3 for making coarse phase adjustments. The evaluating circuit 15 can be implemented as a quadrature demodulator or an I-Q demodulator. It requires only a coarse phase adjustment to be able to distinguish between I and Q components, since the signal to be compensated does not have a fixed phase position.

Also shown are fine-adjusting means 17 for the optical filter 2.

The incoming, spectrum-encoded optical signal first passes through the coupler 11, where the test signal $U_e$ is injected. This test signal is generated by the light-emitting diode 6, which is operated by the control 7 (HF current source) at a frequency $f_0$. The optical signal, to which the test signal $U_e$ has now been added, passes through the optical isolator 12, which prevents reflected signal components from being scattered back into the transmission network. In the second coupler 10, the signals are split between two branches. Ideally, the optical filter 2 should only pass the desired signal $U_0$ into branch A and reject all interference. Generally, however, a major part of the signal to be detected, $U_0$, is fed into branch A, while a small part $\delta U_0$ is coupled to branch B. The interference signal is partially reflected in the optical filter and fed into branch B. The test signal $U_e$ is also split between the two branches. The composite signals in the two branches are converted into electric signals by photodiodes 4 and then amplified by amplifier unit 13. The signal in the lower branch B then passes through delay-adapting means 8 and amplitude-adapting means 9 before being applied to the negative input of the differential amplifier 5. The delay and amplitude of the signal in the lower receiver arm can be adjusted via respective feedback control loops. To this end, the detected test signal of the light-emitting diode 6 is measured after the differential amplifier by an evaluating circuit 15. The phase of the signal is coarsely adjusted by the adjusting unit 3, and fine phase adjustment is performed by means of the low-pass filter 11 and the integrator 11. The phase in branch B is adjusted by the phase shifter 14. The signal in branch B is then amplified, with the measure of the amplification being derived from the I signal passing through the low-pass filter 6 and the integrator 16.

When the propagation delay and the level are matched ($\phi_1=\phi_2=\phi, A_1=A_2=A$), the output of the differential amplifier is the desired signal:

$$U_a(t) = A e^{j\Phi} \cdot (U_0(t) - \delta U_0(t))$$

The propagation delays and signal levels may be acted upon electrically, as in the embodiment described, or optically. It is also possible to provide preset compensation elements for delay and amplitude in the upper arm of the receiver. The modulation of the light-emitting diode 6 may be a sine-wave modulation, but any other type of modulation, such as data modulation, is also possible as long as the test signal can be filtered from the composite signal.

The fine-adjusting means 17 for the optical filter 2 permit an adjustment to different spectra of the spectrum-encoded signal. This allows simple channel separation.

To accomplish this, the receiver includes delay-adapting means and amplitude-adapting means which cause the two branches to be matched via a feedback control loop. An amplifier 5 is fed by the difference signal of the two branches, so that the amplification is not affected by additional offsets or interference signals. The control thus allows optimum utilization of the dynamic range of the amplifier.

It is particularly advantageous to connect the delay-adapting means, the amplitude-adapting means, and the control means for the light-emitting diode to an IQ demodulator and to detect the unsuppressed portion of the test signal as a measure of the control. With a perfect match, the test signal is thus completely suppressed, so that the interference signals are eliminated.

Figure 4:
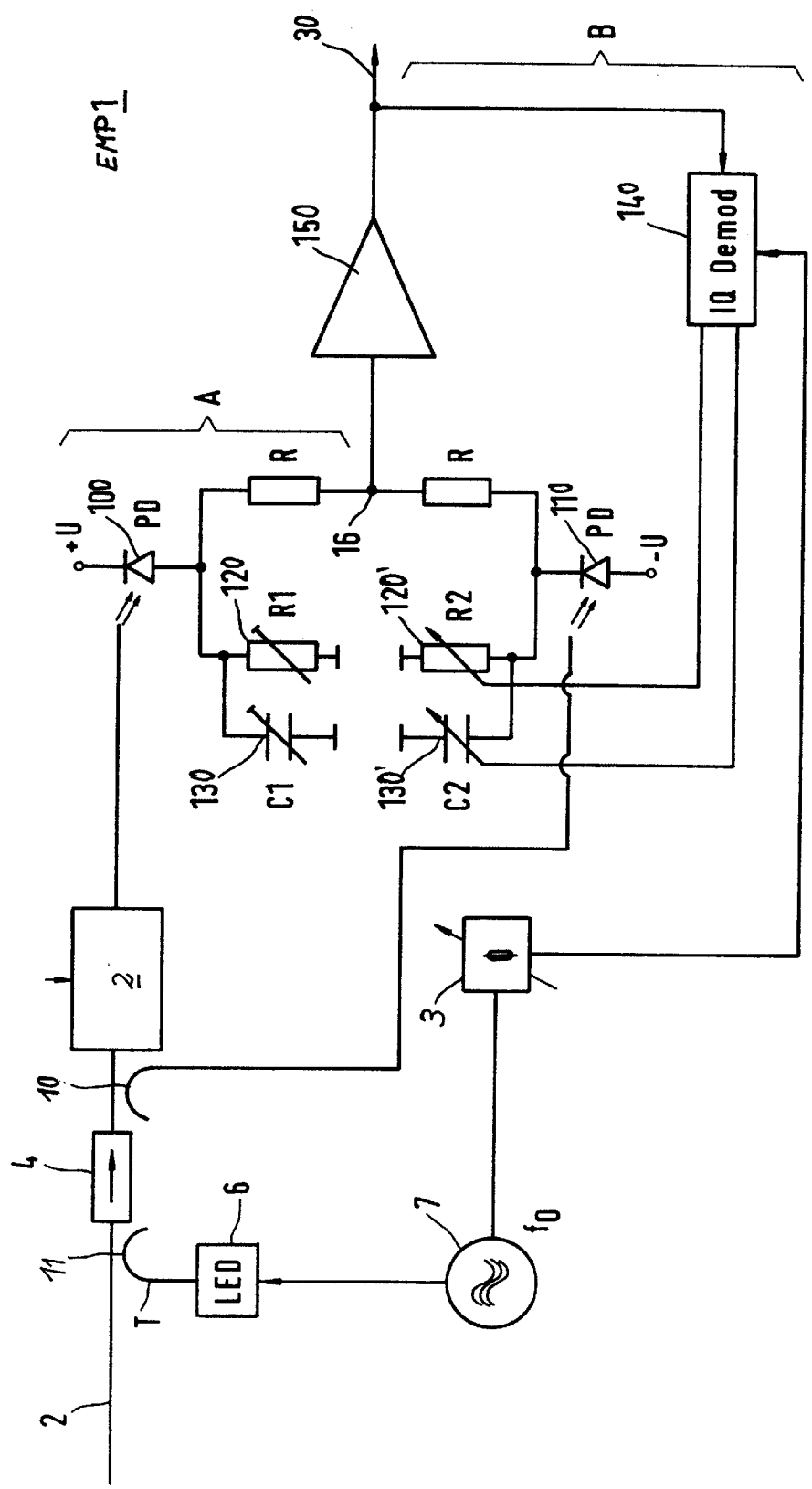
FIG. 4 shows an arrangement in a receiver for detecting spectrum-encoded signals in a further embodiment of the invention.

A further embodiment of the invention is illustrated in FIG. 4 and will be explained in the following.

FIG. 4 shows an arrangement in a receiver EMP1 for detecting spectrum-encoded signals. The signal received by the receiver EMP1 consists of a multitude of different spectra which are placed on the transmission link by different transmitters. These spectrum-encoded, individual channels are separated in the receiver EMP1. The incoming signal passes through a coupler 11 which is connected to a light-emitting diode 6 with an associated control 7, implemented with an HF current source. The signal passes through an optical isolator 4 and a further coupler 10 which divides it between two separate branches A and B. The signal of branch A passes through an optical filter 2 and is converted into electrical form by a photodiode 100. The electric signal can be varied by means of a variable capacitor 130 and a variable resistor 120 and is applied via a resistor R and a summing point 16 to the input of the amplifier 150.

The signal travelling along branch B passes through a photodiode 110 and, analogously the signal of branch A, is variable by means of a variable capacitor 130' and a variable resistor 120'0 and connected to the summing point 16 and the amplifier 150.

The control of the phase and amplitude of the two branches is effected via a signal tap at the output end 30 of the amplifier 150, where the resulting signal is tapped.

The output of the amplifier 150 is connected to an input of an evaluating circuit 140 in which the output signal is separated into an in-phase component I and a quadrature component Q. The I signal controls the amplitude adaptation. The Q signal serves to control the phase adjustment. A coarse phase adjusting component 3 is connected to the evaluating circuit 140. The evaluating circuit 140 can be implemented as a quadrature demodulator or an I-Q demodulator. It requires only a coarse phase adjustment to be able to distinguish between I and Q components, since the signal to be compensated does not have a fixed phase position for the time being. The evaluating circuit 140 is connected at the output end to the variable components of branch B. To be able to compensate for any differences in the propagation delays and intensities of the optical signals, the photodiodes 100 and 110 are loaded with controllable, complex impedances. Such a complex impedance is implemented, for example, by connecting resistors and capacitors in parallel. The resistors can be implemented with FETs, and the capacitors with varactor diodes, so that electrical variation of the resistance and capacitance values becomes possible. In the upper branch, the coarse adjustment is made. The lower branch B is connected to the evaluating unit 140, which permits fine adjustment.

The incoming, spectrum-encoded optical signal first passes through the coupler 11, where the test signal $U_e$ is injected. This test signal is generated by the light-emitting diode 6, which is operated by the control 7 (HF current source) at a frequency $f_0$. The optical signal, to which the test signal $U_e$ has now been added, passes through the optical isolator 4, which prevents reflected signal portions from being scatttered back into the transmission network. In the second coupler 10, the signals are divided between two branches. Ideally, the optical filter 2 should only pass the desired signal $U_0$ into branch A and reject all interference. In general, however, a large part of the signal to be detected, $U_0$, will be fed into branch A, while a small part $\delta U_0$ will be coupled to branch B. The interference signal is partially reflected in the optical filter and fed into branch B. The test signal $U_e$ is also divided between the two branches. The composite signals in the two branches are converted into electric signals by photodiodes 100 and 110, respectively, and then amplified by amplifier unit 150. The electric signal in the lower branch B is loaded with a controllable, complex impedance and is applied to the input of amplifier 150. The propagation delay and the amplitude of the signal in the lower receiver arm can be adjusted via respective feedback control loops. To accomplish this, the detected test signal of the light-emitting diode 6 is measured after the differential amplifier by means of the evaluating circuit 140. The phase of the signal is coarsely adjusted by the adjusting unit 3, and the fine adjustment is made by the I-Q demodulator 140.

The propagation delays and signal levels may be acted upon electrically, as in the embodiment described, or optically. It is also possible to provide preset compensation elements for delay and amplitude in the upper arm of the receiver. The modulation of the light-emitting diode 6 may be a sine-wave modulation, but any other type of modulation, such as data modulation, is also possible as long as the test signal can be filtered from the composite signal. Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A receiver for receiving optical signals from a communication network, comprising:

a signal processing device;

an optical coupling device, operatively connected to the communication network, for receiving the optical signals, the optical signals containing noise;

an optical filtering device, disposed between the signal processing device and the optical coupling device, for filtering the optical signals received through the optical coupling device, the optical filtering device providing a filtered portion of the optical signals to the signal processing device in a first path, and reflecting a rejected portion of the optical signals to the optical coupling device, wherein a part of the rejected portion of the optical signals is provided through the optical coupling device to the signal processing device in a second path, so as to allow the signal processing device to combine the filtered portion of the optical signals and said part of the rejected portion of the optical signals for providing noise compensated signals in a downstream direction from the filtered portion of the optical signals, a test signal source coupled to the first and second paths for providing a test signal thereto to determine different propagation factors in the first and second paths; and a compensation mechanism, disposed in at least one of the first and second paths for compensating for the different propagation factors.

2. The receiver of claim 1, wherein the signal processing device comprises:

a first optical to electrical signal converter, operatively connected to the optical filtering device to receive the filtered portion of the optical signals, for converting the received filtered portion of the optical signals into a first electrical signal;

a second optical to electrical signal converter, operatively connected to the optical coupling device to receive said part of the rejected portion of the optical signals, for converting the received part of the rejected portion of the optical signals into a second electrical signal; and an electrical signal processor, operatively connected to the first and second optical to electrical signal converters, for combining the first and second electrical signals into the noise compensated signals.

3. The receiver of claim 1, further comprising:

an optical transmission line, disposed between the optical coupling device and the optical filtering device, for conveying at least part of the optical signals received through the optical coupling device to the optical filtering device in a first transmission direction, and for conveying the rejected portion of the optical signals to the optical coupling device; and a coupling means, optically coupled to the transmission line, for removing said part of the rejected portion of the optical signals from the optical coupling device in a second transmission direction opposite to the first transmission direction.

4. The receiver of claim 1, wherein the optical filtering device comprises a periodic optical filter.

5. The receiver of claim 1, wherein the optical filtering device comprises a Fabry-Perot filter.

6. The receiver of claim 2, wherein the electrical signal processor comprises a differential amplifier having two inputs operatively connected to the first and second paths.

7. The receiver of claim 1, further comprising:

an optical isolator, disposed between the optical coupling device and the communication network, for preventing at least a part of the rejected portion of the optical signals from going back to the communication network.

8. The receiver of claim 2, wherein the optical coupling device has a coupling factor such that the first electrical signal is substantially equal to the second electric signal on the average.

* * * * *